(12) United States Patent
Yun

(10) Patent No.: US 8,612,995 B1
(45) Date of Patent: Dec. 17, 2013

(54) METHOD AND APPARATUS FOR MONITORING CODE INJECTION INTO A PROCESS EXECUTING ON A COMPUTER

(75) Inventor: James Yun, Hacienda Heights, CA (US)

(73) Assignee: Symantec Corporation, Mountain View, CA (US)

( * ) Notice: Subject to any disclaimer, the term of this patent is extended or adjusted under 35 U.S.C. 154(b) by 962 days.

(21) Appl. No.: 12/415,803

(22) Filed: Mar. 31, 2009

(51) Int. Cl.
*G06F 13/00* (2006.01)

(52) U.S. Cl.
USPC ................ 719/313; 719/328; 726/23; 726/24

(58) Field of Classification Search
USPC .............................. 719/313, 328; 726/23, 24
See application file for complete search history.

(56) References Cited

U.S. PATENT DOCUMENTS

| | | | | |
|---|---|---|---|---|
| 6,698,016 | B1 * | 2/2004 | Ghizzoni | 717/162 |
| 7,020,895 | B2 * | 3/2006 | Albrecht | 726/22 |
| 2007/0094496 | A1 * | 4/2007 | Burtscher | 713/164 |
| 2009/0077663 | A1 * | 3/2009 | Sun et al. | 726/23 |
| 2009/0178061 | A1 * | 7/2009 | Sandoval et al. | 719/328 |
| 2009/0199297 | A1 * | 8/2009 | Jarrett et al. | 726/24 |
| 2010/0146589 | A1 * | 6/2010 | Safa | 726/3 |

OTHER PUBLICATIONS

John L. Hennessy & David A. Patterson, Computer Architecture: A Quantitative Approach, Morgan Kaufmann, 3rd Edition, p. 469-470, 2003.*

* cited by examiner

*Primary Examiner* — Andy Ho
(74) *Attorney, Agent, or Firm* — Wilmer Cutler Pickering Hale and Dorr LLP

(57) ABSTRACT

Method, apparatus, and computer readable medium for monitoring code injection in a computer is described. In some examples, at least one application programming interface (API) call configured to inject data into a process executing on the computer is intercepted. The data is parsed to identify instruction code to be performed by the process. The instruction code is compared with instances of predetermined instruction code to produce a score for the instruction code. The data is prevented from being injected into the process in response to the score satisfying a threshold score. The data may be allowed to be injected into the process in response to the score not satisfying the threshold score.

20 Claims, 3 Drawing Sheets

METHOD AND APPARATUS FOR MONITORING CODE INJECTION INTO A PROCESS EXECUTING ON A COMPUTER

BACKGROUND OF THE INVENTION

1. Field of the Invention

The present invention relates generally to computers. More particularly, the present invention relates to a method and apparatus for monitoring code injection into a process executing on a computer.

2. Description of the Related Art

In computing, a "process" is generally a set of instructions ("code") being executed by a computer. A computer typically executes several different processes. A process may include one or more "threads". A thread is generally an individual task being performed by the process. Computer operating systems are typically multi-threaded such that multiple threads can execute concurrently.

Some operating systems support the injection of data into a process from a source outside of the process (generally referred to "injection"). For example, some MICROSOFT WINDOWS operating systems support application programming interface (API) functions for writing data to an area of memory dedicated to a process, e.g., the WriteProcess-Memory function as defined in the WIN32 API. Such API functions can be used to inject code into a process ("code injection") with the intent that the process execute the injected code. Code injection can be used as a valid mechanism for modifying execution of a process. However, code injection can also be used to inject malicious code into a process in order to achieve various malevolent purposes, such as gaining information, privileges, or computer access without authorization. For example, code injection can be used to execute in a trusted process as a way to circumvent security software. Some mechanisms for dealing with malicious code injection involve alerting the user every time a code injection operation is requested, and allowing the user to accept or deny the proposed code injection. Such alerts, however, presuppose that the user is experienced enough to understand why the code injection is being request and whether to allow or deny such code injection. Less savvy users may be confused and/or frustrated by such alerts, which increases the chances that they will inadvertently allow malicious code to be executed by their computers.

Accordingly, there exists a need in the art for monitoring code injection into a process executing on a computer that overcomes the aforementioned deficiencies.

SUMMARY OF THE INVENTION

An aspect of the invention relates to monitoring code injection in a computer is described. In some embodiments, at least one application programming interface (API) call configured to inject data into a process executing on the computer is intercepted. The data is parsed to identify instruction code to be performed by the process. The instruction code is compared with instances of predetermined instruction code to produce a score for the instruction code. The data is prevented from being injected into the process in response to the score satisfying a threshold score. The data may be allowed to be injected into the process in response to the score not satisfying the threshold score.

Another aspect of the invention relates to analyzing instruction code at a server. In some embodiments, the instruction code is received in a submission from a computer over a network, the instruction code being identified by the computer in response to intercepting at least one application programming interface (API) call configured to inject the instruction code into a process executing on the computer. The instruction code is analyzed to determine operation codes and operands therein. The instruction code is classified as known malicious instruction code or potentially malicious instruction code in response to the operation codes and the operands. The instruction code as classified is sent to the computer over the network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
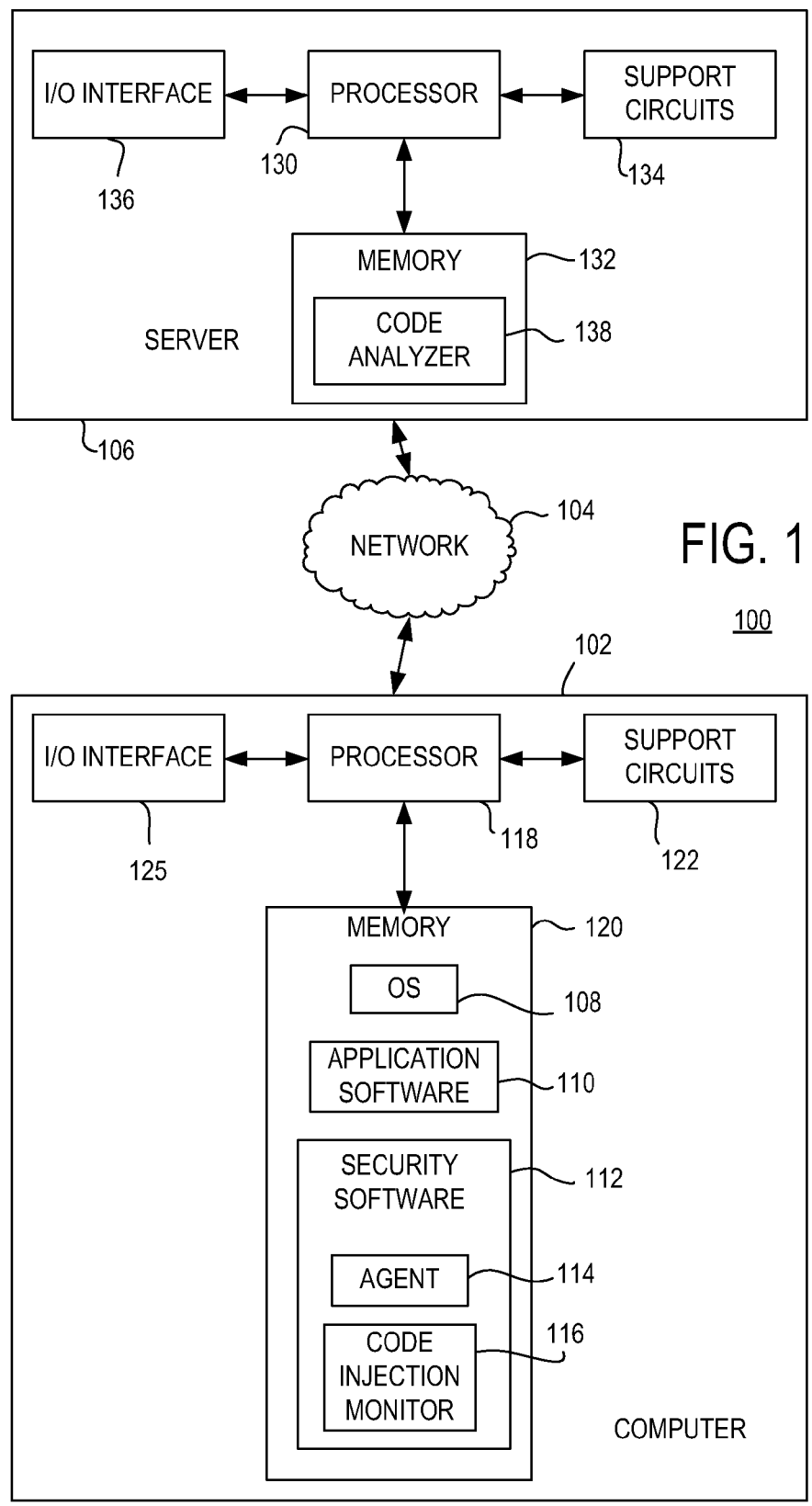
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes a client computer 102, a network 104, and a server computer 106. The network 104 comprises a communication system that connects computer systems by wire, cable, fiber optic, and/or wireless links facilitated by various types of well-known network elements, such as hubs, switches, routers, and the like. In particular, the network 104 may connect the client computer 102 and the server computer 106. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN).

The client computer 102 illustratively includes a processor 118, a memory 120, various support circuits 122, an I/O interface 125. The processor 118 may include one or more microprocessors known in the art. The support circuits 122 for the processor 118 include conventional cache, power supplies, clock circuits, data registers, I/O interfaces, and the like. The I/O interface 125 may be configured for communication with the network 104. The memory 120 may include one or more of the following random access memory, read only memory, magneto-resistive read/write memory, optical read/write memory, cache memory, magnetic read/write memory, and the like.

The client computer 102 includes an operating system (OS) 108, application software 110, and security software 112. The operating system 108 may be any type of operating system known in the art, such as any MICROSOFT WINDOWS, APPLE MACINTOSH, or like type operating systems known in the art. The application software 110 may include any of a myriad of programs configured for execution within the operating system 108. The security software 112 is configured to monitor the client computer 102 to detect, isolate, and remove malware. The security software 112 may include an agent 114 and a code injection monitor 116. The agent 114 is configured for communication with the server 106 via the network 104. The agent 114 may be used to receive update data from the server 106 to facilitate detection of malware, as discussed below.

The code injection monitor 116 is configured to monitor code injection in the client computer 102. In some embodiments, the code injection monitor 116 is configured to intercept one or more function calls to the application programming interface (API) of the operating system 108 ("API calls"). The API calls intercepted by the code injection monitor 116 are configured to inject data into a process executing on the client computer 102. In some embodiments, the type of API calls intercepted by the code injection monitor 116 can include functions configured to write data to an area of the memory 120 dedicated to a process. For example, in the WIN32 API of some MICROSOFT WINDOWS operating systems, the WriteProcessMemory function is configured to write data to a process. The code injection monitor 116 can intercept the API calls using system hooks registered with the operating system 108.

Thus, for a WIN32 API, the code injection monitor 116 may monitor calls to the WriteProcessMemory function. It is to be understood that the code injection monitor 116 can monitor other types of API calls, such as those that create new execution threads of a process (e.g., WIN32 API CreateRemoteThread in WIN32 API), those that modify context of threads of a process (e.g., WIN32 API SetThreadContext), those that insert a procedure call to the execution queue of a process (e.g., WIN32 QueueUserApc), and the like. Further, while specific WIN32 API function calls have been described by example, it is to be understood that the code injection monitor 116 can intercept similar function calls in different APIs of different types of operating systems.

Upon intercepting an API call, the code injection monitor 116 is configured to parse the injected data to identify instruction code to performed by the target process. That is, an API call may be attempting to inject instruction code into an area of the memory 120 dedicated to the instructions of the target process so that the process executes the injected instruction code. The instruction code to be injected may be procedure call(s), new threads, modifications of existing threads, and the like. To detect the instruction code to be injected, the code injection monitor 116 can identify particular patterns in the data, such as patterns indicative of operation codes (opcodes), operands, and the like.

Having identified potential injected instruction code, the code injection monitor 116 is configured to compare the instruction code with instances of predetermined instruction code to produce a score for the instruction code. In some embodiments, the instances of predetermined instruction code include instance(s) of known malicious instruction code. The instance(s) of known malicious instruction code may be represented as a signature or the like against which the injected instruction code can be compared. In some embodiments, the instances of predetermined instruction code include instance(s) of potentially malicious instruction code. Potentially malicious instruction code is code that is not malicious by itself, but may be maliciously used in particular contexts. For example, an instruction to erase a file is a valid instruction if issued by the user using file management software, but is likely maliciously used if injected into a process unrelated to file management. This type of comparison to identify potentially malicious instruction code is referred to as a heuristic analysis.

The score produced by the code injection monitor 116 for injected instruction code can be indicative of the likeliness of it being malicious code. For example, if the injected instruction code matches a signature of known malicious code, the score may indicate that the injected instruction code is malicious or very likely malicious. If the code injection monitor 116 employs a heuristic analysis, the score may be variable based on number and/or arrangement of instructions identified as potentially malicious. For example, the more potentially malicious instructions detected, the more likely the injected instruction code is malicious.

The code injection monitor 116 can then compare the score given to the injected source code with a threshold score. If the score satisfies the threshold score, then the code injection monitor 116 can prevent the instruction code from being injected to the target process. If the score does not satisfy the threshold score, then the code injection monitor 116 can allow the instruction code to be injected into the target process. In this manner, the code injection monitor 116 can automatically detect malicious or likely malicious injection of code into a process. The code injection monitor 116 does not require input from the user in response to an alert or the like. The code injection monitor 116 may allow a user to set the threshold score in order to have some control over the process. The code injection monitor 116 may also produce a log file or the like for reporting which code injection attempts have been blocked and for what reason.

In some embodiments, the code injection monitor 116 may provide information related to detected code injections to the agent 114. The agent 114 may include this information in a submission to the server 106. The server 106 may be managed by the provider of the security software 112. In this manner, the provider of the security software 112 may collect statistics related to code injections across many users. The statistics can be used to identify known malicious code injections, potentially malicious code injections, and benevolent code injections. The agent 114 can then receive information from the server 106 to provide the predetermined instruction code against with the injected instruction code is compared. In this manner, the code injection monitor 116 can be updated over time to adapt to new types of malicious, potentially malicious, and benevolent code injections.

The server 106 illustratively includes a processor 130, a memory 132, various support circuits 134, an I/O interface 136. The processor 130 may include one or more microprocessors known in the art. The support circuits 134 for the processor 130 include conventional cache, power supplies, clock circuits, data registers, I/O interfaces, and the like. The I/O interface 136 may be configured for communication with the network 104. The memory 132 may include one or more of the following random access memory, read only memory, magneto-resistive read/write memory, optical read/write memory, cache memory, magnetic read/write memory, and the like.

The server 106 is configured with a code analyzer 138. The code analyzer 138 may include software (e.g., program code), stored in the memory 132, configured for execution by the processor 130. The code analyzer 138 is configured to cooperate with security software 112 in the computer 102 to receive submissions from the computer 102 and to provide classified instruction code to the computer 102. In particular, the code analyzer 138 is configured to receive instruction code in a submission from the computer 102 over the network. As noted above, the instruction code can be identified by the code injection monitor 116 in response to intercepting API call(s) configured to inject the instruction code into a process executing on the computer 102. The code analyzer 138 can analyze the instruction code to determine operation codes and operands therein. Operation codes can include codes executable by a processor for performing some function (e.g., assembly language codes, machine codes, etc.). Operands can include data operated on by the operation codes. The code analyzer 138 can classify the instruction code as known malicious instruction code or potentially malicious instruction code in response to the analysis of the operation codes and the operands. The code analyzer 138 can then send the classified instruction code to the computer 102 over the network 104. It is to be understood that the code analyzer 138 may receive submissions from, and provide classified instruction code to, multiple computers on the network.

Figure 2:
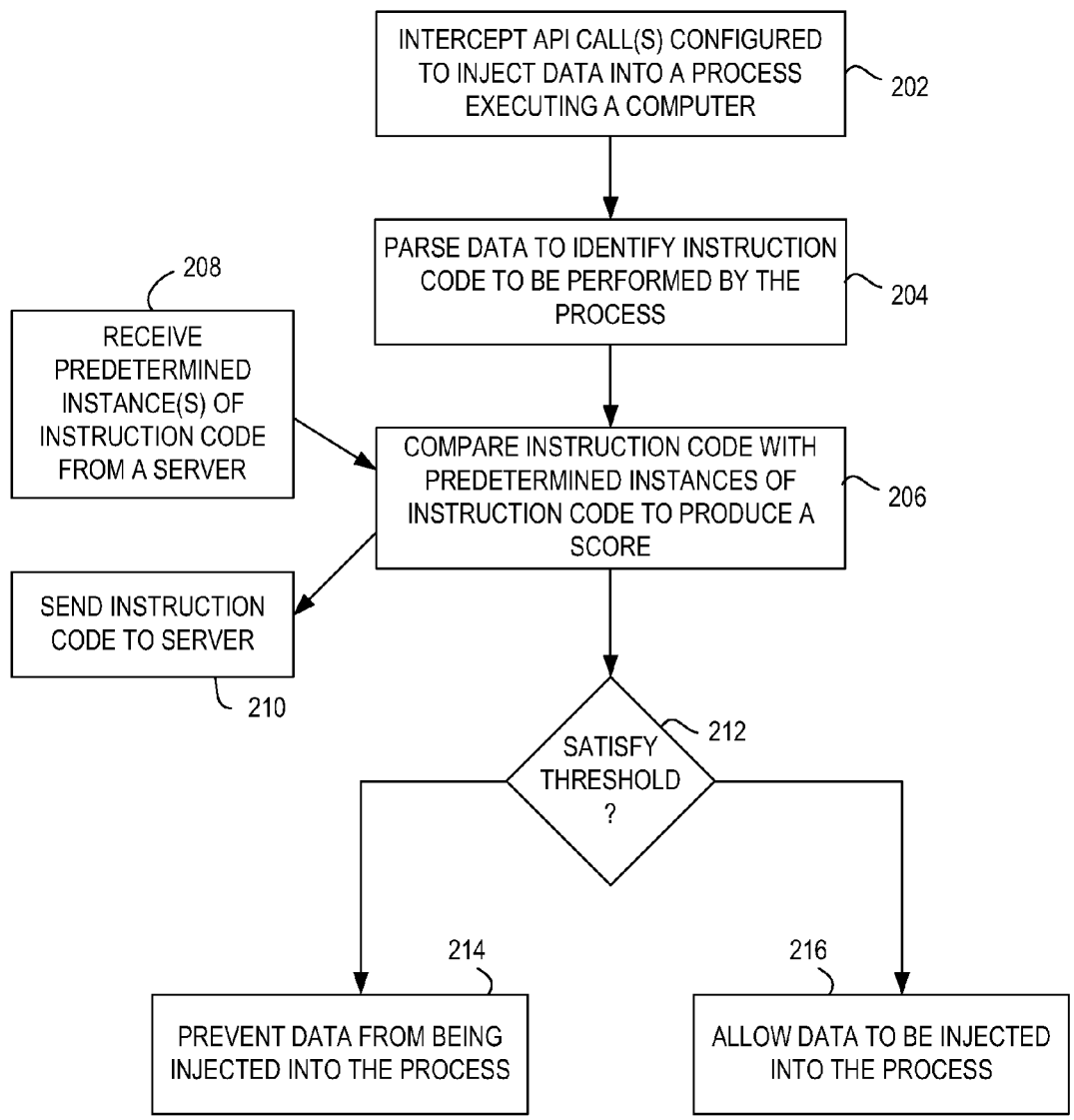
FIG. 2 is a flow diagram depicting a method of monitoring code injection according to some embodiments of the invention.

FIG. 2 is a flow diagram depicting a method 200 of monitoring code injection according to some embodiments of the invention. The method 200 may be performed by the client computer 102 shown in FIG. 1. For example, the method 200 may be performed through execution of the code injection monitor 118. The method 200 begins at step 202, where at least one API call configured to inject data into a process executing on a computer is/are intercepted. At step 204, the data is parsed to identify instruction code to be performed by the process. At step 206, the instruction code is compared with instances of predetermined instruction code to produce a score for the instruction code. At step 208, one or more of the instances of the predetermined instruction code may be received from a server over the network. At step 210, the instruction code as identified can be sent to a server over the network.

At step 212, a determination is made whether the score satisfies a threshold score. If so, the method 200 proceeds to step 214, where the data is prevented from being injected into the process. If the score does not satisfy the threshold, the method 200 proceeds to step 216, where the data is allowed to be injected into the process. The method 200 may be repeated as API calls are made to inject data into various processes over time.

Figure 3:
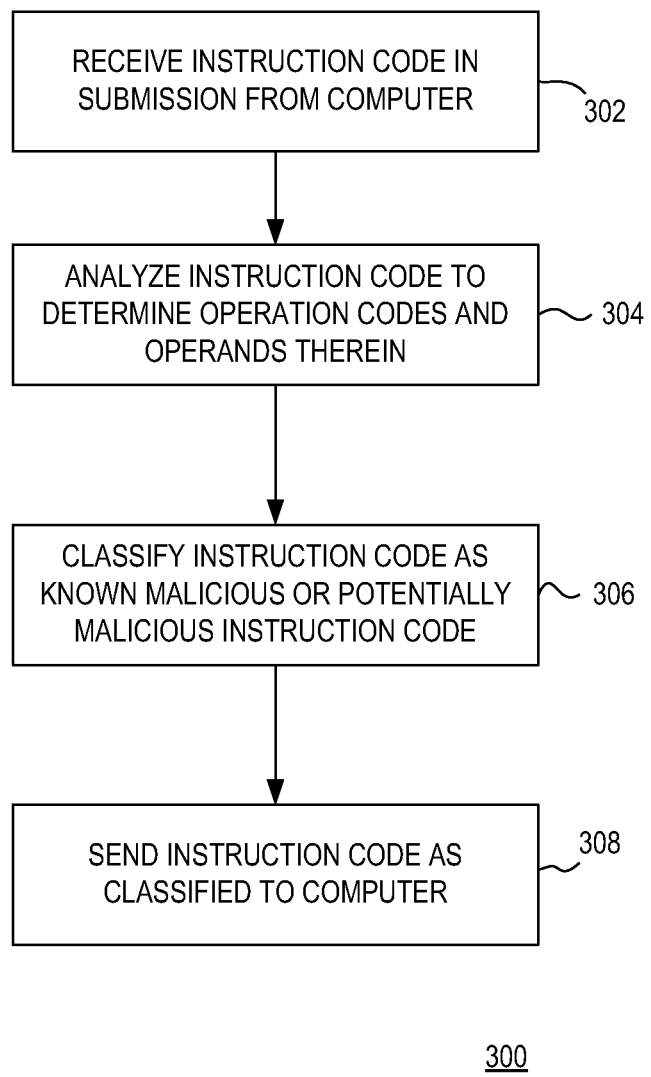
FIG. 3 is a flow diagram depicting a method 300 of analyzing instruction code at a server according to some embodiments of the invention.

FIG. 3 is a flow diagram depicting a method 300 of analyzing instruction code at a server according to some embodiments of the invention. The method 300 may be performed by the server 106 shown in FIG. 1. For example, the method 300 may be performed through execution of the code analyzer 138 by the processor 130 in the server 106. The method 300 begins at step 302, where the instruction code is received in a submission from a computer over a network (e.g., the computer 102). The computer 102 can identify the instruction code in response to intercepting API call(s) configured to inject the instruction code into a process executing on the computer 102. At step 304, the instruction code is analyzed to determine operation codes and operands therein.

At step 306, the instruction code is classified as known malicious instruction code or potentially malicious instruction code in response to the operation codes and the operands. For example, the code analyzer 138 can compare the operation codes and operands as configured with known malicious or potentially malicious configurations of operation codes and operands. The code analyzer 138 may interact with a user to receive indications of malicious or potentially malicious operation codes and operands. At step 308, the instruction code as classified is sent to the computer over the network. For example, the computer 102 can use the instruction code as classified as the instances of predetermined instruction code against which injected instruction code is scored.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of monitoring code injection in a computer, comprising:
   intercepting at least one application programming interface (API) call configured to inject data into a trusted process executing in an operating system on the computer;
   parsing the data to identify instruction code to be performed by the trusted process;
   comparing the instruction code with instances of predetermined instruction code to produce a score for the instruction code; and
   preventing the data from being injected into the trusted process in response to the score satisfying a threshold score.

2. The method of claim 1, further comprising:
   allowing the data to be injected into the trusted process in response to the score not satisfying the threshold score.

3. The method of claim 1, wherein the at least one API call includes a function configured to write the data to an area of memory in the computer dedicated to the trusted process.

4. The method of claim 1, wherein the instruction code is configured to cause a new execution thread to begin in an address space of the trusted process.

5. The method of claim 1, wherein the instruction code is configured to add a procedure call to an execution queue of the trusted process.

6. The method of claim 1, wherein the instances of predetermined instruction code include at least one instance of known malicious instruction code.

7. The method of claim 1, wherein the instances of predetermined instruction code include at least one instance of potentially malicious instruction code.

8. The method of claim 1, further comprising:
   sending the instruction code as identified in a submission from the computer to a server over a network.

9. The method of claim 8, further comprising:
   receiving at least one of the instances of predetermined instruction code at the computer from a server over a network.

10. An apparatus for monitoring code injection in a computer, comprising:
    means for intercepting at least one application programming interface (API) call configured to inject data into a trusted process executing in an operating system on the computer;

means for parsing the data to identify instruction code to be performed by the trusted process;

means for comparing the instruction code with instances of predetermined instruction code to produce a score for the instruction code; and means for preventing the data from being injected into the trusted process in response to the score satisfying a threshold score.

11. The apparatus of claim 10, further comprising:

means for allowing the data to be injected into the trusted process in response to the score not satisfying the threshold score.

12. The apparatus of claim 10, wherein the at least one API call includes a function configured to write the data to an area of memory in the computer dedicated to the trusted process.

13. The apparatus of claim 10, wherein the instruction code is configured to cause a new execution thread to begin in an address space of the trusted process.

14. The apparatus of claim 10, wherein the instruction code is configured to add a procedure call to an execution queue of the trusted process.

15. The apparatus of claim 10, wherein the instances of predetermined instruction code include at least one instance of known malicious instruction code.

16. The apparatus of claim 10, wherein the instances of predetermined instruction code include at least one instance of potentially malicious instruction code.

17. A method of analyzing instruction code at a server, comprising:

receiving the instruction code in a submission from a computer over a network, the instruction code being identified by the computer in response to intercepting at least one application programming interface (API) call configured to inject the instruction code into a trusted process in an operating system executing on the computer;

analyzing the instruction code to determine operation codes and operands therein;

classifying the instruction code as known malicious instruction code or potentially malicious instruction code in response to the operation codes and the operands; and sending the instruction code as classified to the computer over the network.

18. The method of claim 17, wherein the at least one API call includes a function configured to write the data to an area of memory in the computer dedicated to the trusted process.

19. The method of claim 17, wherein the instruction code is configured to begin a new execution thread in an address space of the trusted process.

20. The method of claim 17, wherein the instruction code is configured to add a procedure call to an execution queue of the trusted process.

* * * * *